United States Patent
Hwang

(10) Patent No.: US 10,480,643 B2
(45) Date of Patent: Nov. 19, 2019

(54) HYDRAULIC CONTROL SYSTEM OF AUTOMATIC TRANSMISSION FOR VEHICLE PROVIDED WITH IDLE STOP AND GO SYSTEM

(71) Applicants: HYUNDAI MOTOR COMPANY, Seoul (KR); KIA MOTORS CORPORATION, Seoul (KR)

(72) Inventor: Jin Young Hwang, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 388 days.

(21) Appl. No.: 15/621,576

(22) Filed: Jun. 13, 2017

(65) Prior Publication Data

US 2018/0163854 A1    Jun. 14, 2018

(30) Foreign Application Priority Data

Dec. 12, 2016    (KR) .......................... 10-2016-0168889

(51) Int. Cl.
| | | |
|---|---|---|
| *F16H 61/00* | (2006.01) | |
| *F15B 11/17* | (2006.01) | |
| *F15B 13/02* | (2006.01) | |
| *F16B 13/06* | (2006.01) | |
| *F15B 13/06* | (2006.01) | |

(Continued)

(52) U.S. Cl.
CPC .......... *F16H 61/0031* (2013.01); *F15B 11/17* (2013.01); *F15B 13/026* (2013.01); *F15B 13/027* (2013.01); *F15B 13/06* (2013.01); *F15B 2211/2053* (2013.01); *F15B 2211/20576* (2013.01); *F15B 2211/2656* (2013.01); *F16H 59/74* (2013.01); *F16H 61/30* (2013.01); *F16H 2059/746* (2013.01)

(58) Field of Classification Search
None
See application file for complete search history.

(56) References Cited

U.S. PATENT DOCUMENTS

| | | | | |
|---|---|---|---|---|
| 3,436,913 A | * | 4/1969 | Junk .......................... | B30B 3/04 60/473 |
| 3,916,624 A | * | 11/1975 | Machens ............... | E02F 9/0841 60/394 |

(Continued)

FOREIGN PATENT DOCUMENTS

| | | |
|---|---|---|
| JP | 2010-216568 A | 9/2010 |
| JP | 2013-015204 A | 1/2013 |

*Primary Examiner* — Colby M Hansen
(74) *Attorney, Agent, or Firm* — Brinks Gilson & Lione

(57) ABSTRACT

A hydraulic control system of an automatic transmission for a vehicle provided with an ISG system is disclosed. The hydraulic control system may include: a mechanical hydraulic pump driven by an engine; a linear solenoid valve to control hydraulic pressure generated by the mechanical hydraulic pump; a first switch valve to selectively supply or not to supply controlled hydraulic pressure to one of friction members; an electric hydraulic pump driven by electric energy; and a second switch valve to selectively supply the hydraulic pressure, generated by the electric hydraulic pump, to the one friction member or to the linear solenoid valve. The hydraulic control system supplies the hydraulic pressure to one of the friction members operated at a gear stage where starting control is performed.

11 Claims, 3 Drawing Sheets

Figure 1:
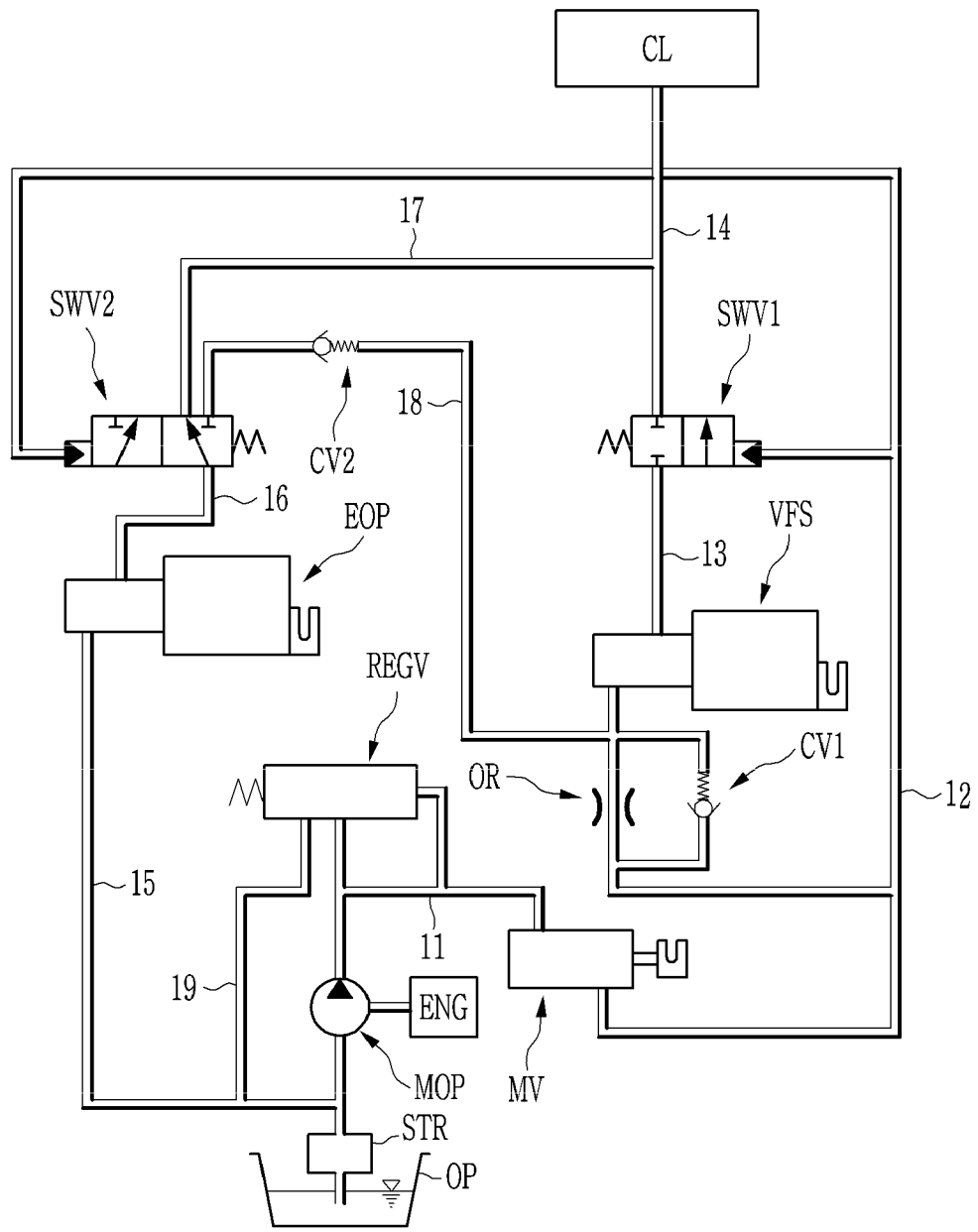

(51) Int. Cl.
    *F16H 61/30*     (2006.01)
    *F16H 59/74*     (2006.01)

(56) References Cited

U.S. PATENT DOCUMENTS

| | | |
|---|---|---|
| 8,303,468 B2 | 11/2012 | Shimizu et al. |
| 8,554,432 B2 | 10/2013 | Shimizu et al. |
| 2012/0163949 A1* | 6/2012 | Okano .................. E02F 9/2239 414/685 |
| 2012/0304630 A1* | 12/2012 | Kawasaki ............. E02F 9/2217 60/325 |
| 2014/0334955 A1* | 11/2014 | Kim ........................ F04B 39/02 417/447 |

* cited by examiner

HYDRAULIC CONTROL SYSTEM OF AUTOMATIC TRANSMISSION FOR VEHICLE PROVIDED WITH IDLE STOP AND GO SYSTEM

CROSS-REFERENCE TO RELATED APPLICATION

This application claims priority to and the benefit of Korean Patent Application No. 10-2016-0168889, filed on Dec. 12, 2016, which is incorporated herein by reference in its entirety.

FIELD

The present disclosure relates to a hydraulic control system of an automatic transmission for a vehicle provided with an idle stop and go (ISG) system.

BACKGROUND

The statements in this section merely provide background information related to the present disclosure and may not constitute prior art.

A vehicle provided with an ISG (Idle Stop & Go) system stops an engine when the vehicle stops and starts the vehicle when the vehicle restarts in order to reduce fuel and emission.

In further detail, the vehicle provided with the ISG system automatically stops engine if idling maintains for a predetermined time after the vehicle stops, and automatically restarts the engine if a brake pedal is released or an accelerator pedal is pushed.

Since a hydraulic pump (mechanical hydraulic pump) in an automatic transmission is not operated during idle stop, hydraulic pressure is not generated in the automatic transmission of the vehicle provided with the ISG system.

If the hydraulic pressure is not generated in the automatic transmission, the hydraulic pressure cannot be supplied to friction members (clutches and brakes) operated at a first forward gear stage (gear stage at which starting control is performed) in a planetary gear set.

When a driver releases the brake pedal or pushes the accelerator pedal for restarting, the engine is automatically restarted and the hydraulic pump of the automatic transmission begins to operate to increase rotation speed.

At this time, the hydraulic pressure in the automatic transmission rises quickly and then is suddenly supplied to the friction members achieving the first gear stage. Therefore, the sudden increase of the hydraulic pressure induces impact to the friction members and the vehicle, thereby causing displeasure of the driver and damage of the friction members.

In order to inhibit or prevent such impact, a neutral state of the transmission is temporarily achieved when restarting the engine. However, we have discovered that since the hydraulic pressure is supplied to the friction members achieving the first forward gear stage after engine starting is performed at the neutral state and the hydraulic pressure is stabilized, a time delay in actually starting the vehicle is very long. Therefore, performing the temporal neutral stage while restarting the engine is rarely applied and impractical to the vehicle.

The above information disclosed in this Background section is only for enhancement of understanding of the background of the present disclosure and therefore it may contain information that does not form the prior art that is already known to a person of ordinary skill in the art.

SUMMARY

The present disclosure provides a hydraulic control system of an automatic transmission for a vehicle provided with an ISG system having advantages of achieving smooth restarting after temporarily stopping an engine by continuously supplying a reserve operating hydraulic pressure to friction members operated at a gear stage (e.g., first forward gear stage or second forward gear stage) where starting control is performed.

A hydraulic control system of an automatic transmission for a vehicle provided with an ISG system in one exemplary form of the present disclosure may be configured to supply hydraulic pressure to at least one of friction members operated at a gear stage where starting control is performed.

In one form, the hydraulic control system may include: a mechanical hydraulic pump driven by torque of an engine to pump a fluid stored in an oil pan and feed; a regulator valve configured to regulate operating hydraulic pressure fed from the mechanical hydraulic pump to be stable; a manual valve configured to receive the hydraulic pressure from the regulator valve through a first hydraulic line and supply the hydraulic pressure to a second hydraulic line by manipulation of a shift lever; a linear solenoid valve configured to control the hydraulic pressure supplied from the manual valve through the second hydraulic line and supply the controlled hydraulic pressure to a third hydraulic line; a first switch valve configured to selectively supply the hydraulic pressure supplied from the linear solenoid valve through the third hydraulic line to the at least one friction member of friction members through a fourth hydraulic line; an electric hydraulic pump driven by electric energy and configured to pump the fluid stored in the oil pan through a fifth hydraulic line and to feed the pumped fluid to the second switch valve through the sixth hydraulic line; and a second switch valve configured to supply the hydraulic pressure of the electric hydraulic pump supplied through the sixth hydraulic line to a seventh hydraulic line connected to the fourth hydraulic line, or to the second hydraulic line at an upstream side of the linear solenoid valve through an eighth hydraulic line.

A check valve and an orifice may be disposed in parallel with each other on the second hydraulic line at the upstream side of the linear solenoid valve.

The first switch valve may be configured to connect the third hydraulic line and the fourth hydraulic line when the hydraulic pressure of the second hydraulic line is supplied to the first switch valve as control pressure.

The second switch valve may be configured to connect the sixth hydraulic line and the eighth hydraulic line when the hydraulic pressure of the second hydraulic line is supplied to the second switch as control pressure, and to connect the sixth hydraulic line and the seventh hydraulic line when the control pressure of the second hydraulic line is not supplied to the second switch valve.

The second switch valve may be configured to supply the hydraulic pressure of the electric hydraulic pump to the linear solenoid valve through the sixth hydraulic line and the eighth hydraulic line in static shift from a drive (D) range to a neutral (N) range.

The electric hydraulic pump may be a solenoid pump.

A second check valve configured to inhibit or prevent the hydraulic pressure from flowing back to the second switch valve may be disposed on the eighth hydraulic line.

A hydraulic control system of an automatic transmission for a vehicle provided with an ISG system in another exemplary form of the present disclosure may include: a mechanical hydraulic pump driven by an engine; a linear solenoid valve configured to control hydraulic pressure generated by the mechanical hydraulic pump or supplied hydraulic pressure; a first switch valve configured selectively to supply or not supply the controlled hydraulic pressure to the at least one friction member of friction members; an electric hydraulic pump driven by electric energy; and a second switch valve configured to supply the hydraulic pressure generated by the electric hydraulic pump to the at least one friction member or to the linear solenoid valve, wherein the first switch valve and the second switch valve are controlled by the same hydraulic pressure.

The same hydraulic pressure may be the hydraulic pressure generated by the mechanical hydraulic pump or the controlled hydraulic pressure therefrom.

The first switch valve may supply the hydraulic pressure supplied from the linear solenoid valve to the at least one friction member, and the second switch valve may supply the hydraulic pressure generated by the electric hydraulic pump to the linear solenoid valve when the mechanical hydraulic pump generates the hydraulic pressure.

The second switch valve may supply the hydraulic pressure generated by the electric hydraulic pump to the at least one friction member when the mechanical hydraulic pump does not generate the hydraulic pressure.

In the exemplary forms of the present disclosure, since reserve operating hydraulic pressure is supplied to a friction member operated at a gear stage where starting control is performed even though an engine is stopped, smooth restart of a vehicle is possible.

In addition, a solenoid pump is used as an electric pump, weight and cost may be reduced.

In addition, mountability of the solenoid pump may be improved by enabling the solenoid pump to be mounted inside a valve body.

Further, the effects which may be obtained or predicted by the exemplary form of the present disclosure will be explicitly or implicitly disclosed in the detailed description of the forms of the present disclosure. That is, various effects which are predicted by the exemplary forms of the present disclosure will be disclosed in the detailed description to be described below.

Further areas of applicability will become apparent from the description provided herein. It should be understood that the description and specific examples are intended for purposes of illustration only and are not intended to limit the scope of the present disclosure.

DRAWINGS

Figure 2:
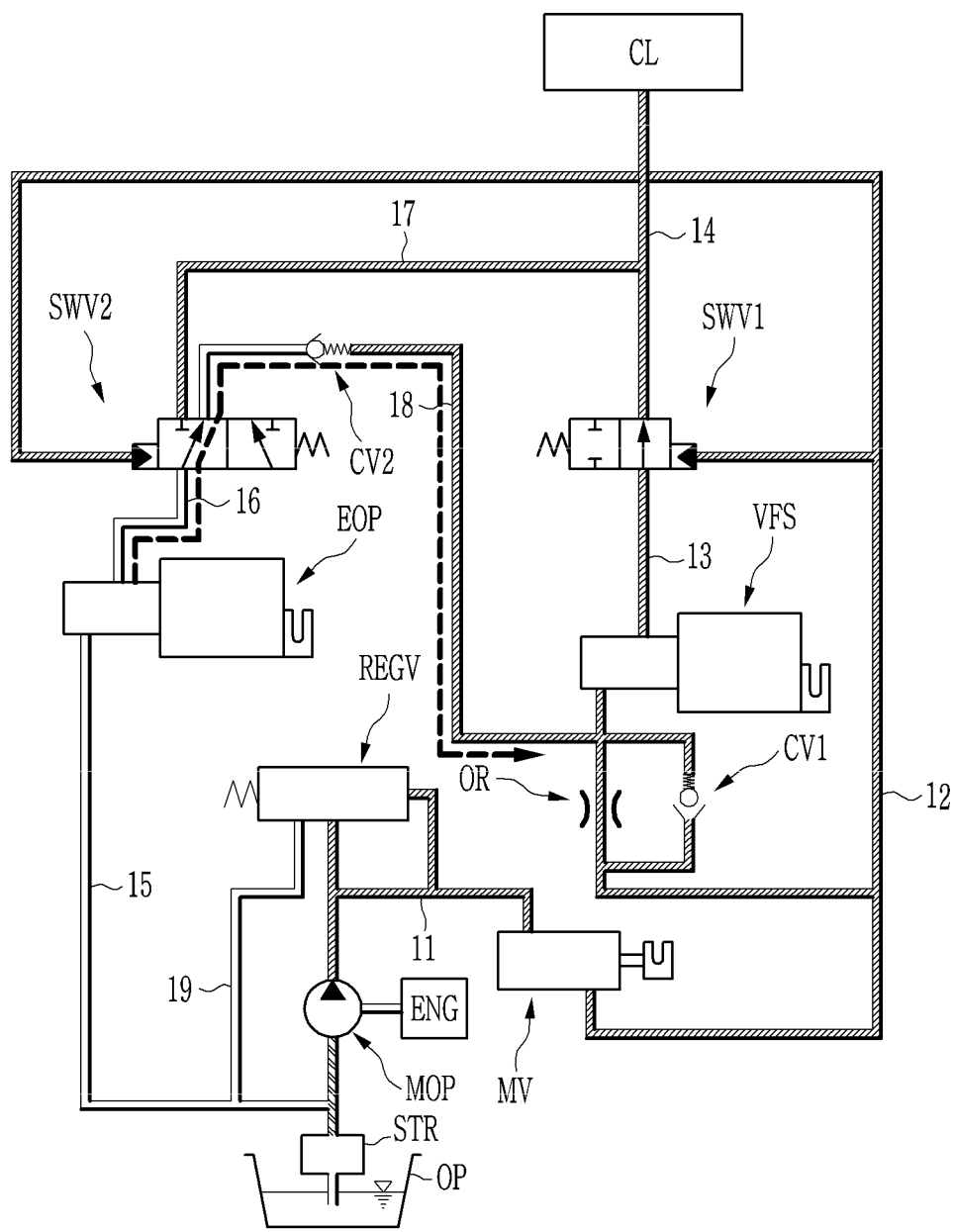
Figure 3:
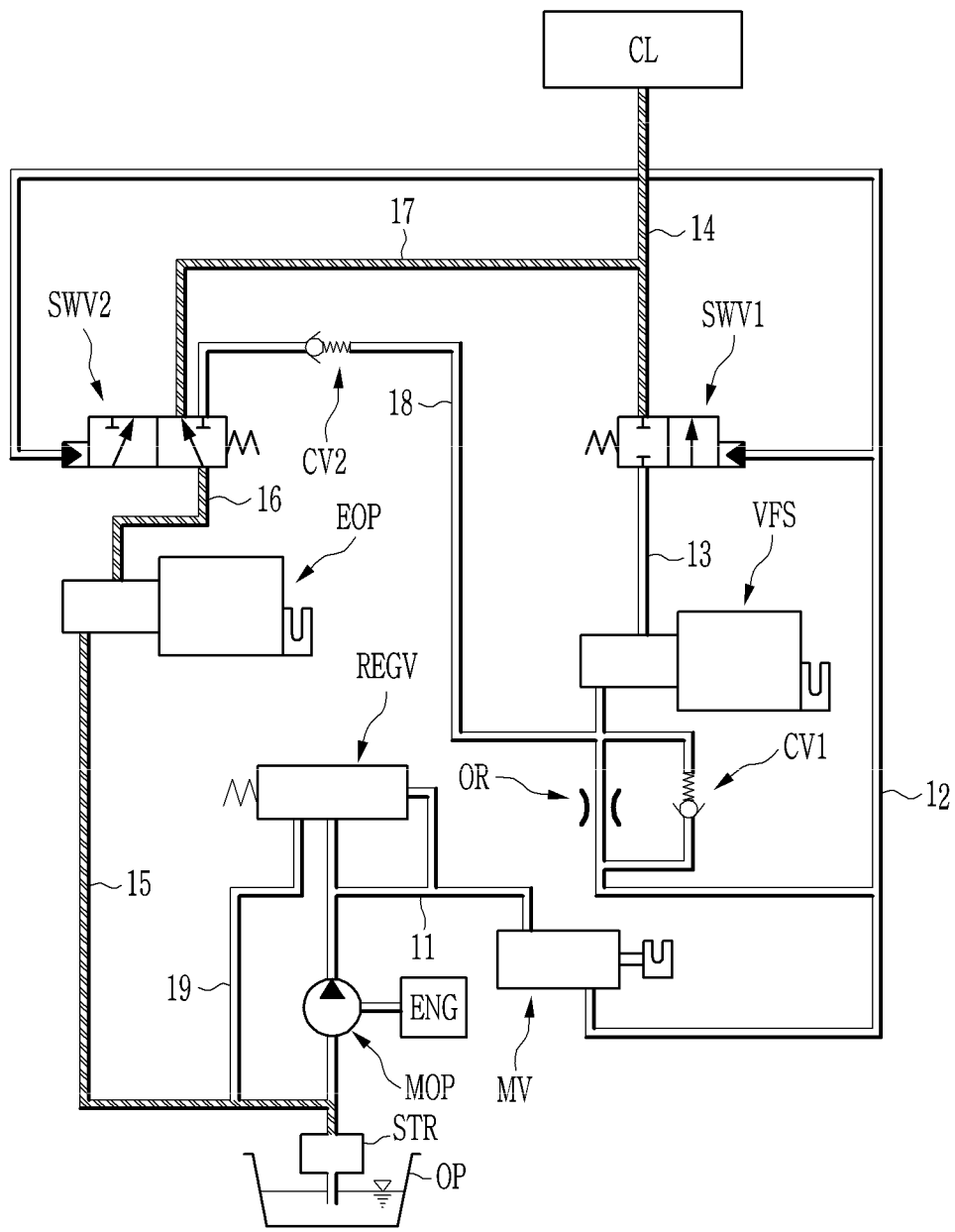

In order that the disclosure may be well understood, there will now be described various forms thereof, given by way of example, reference being made to the accompanying drawings, in which:

FIG. 1 is a schematic diagram of a hydraulic control system of an automatic transmission for a vehicle provided with an ISG system in one exemplary form of the present disclosure, illustrating a hydraulic control system of a friction member related to a gear stage (e.g., first forward gear stage) where starting control is performed;

FIG. 2 illustrates a flow of hydraulic pressure to a friction member related to a gear stage (e.g., first forward gear stage) where starting control is performed when an engine begins to start in a hydraulic control system of an automatic transmission for a vehicle provided with an ISG system in one exemplary form of the present disclosure; and FIG. 3 illustrates a flow of hydraulic pressure to a friction member related to a gear stage (e.g., first forward gear stage) where starting control is performed when an engine is stopped in a hydraulic control system of an automatic transmission for a vehicle provided with an ISG system in an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

To describe the present disclosure explicitly, a part which is not related to the description is omitted and like reference numerals indicate identically or functionally similar elements in the entire specification.

In the following description, dividing names of components into first, second and the like is to divide the names because the names of the components are the same as each other and an order thereof is not particularly limited.

FIG. 1 is a schematic diagram of a hydraulic control system of an automatic transmission for a vehicle provided with an ISG system in an exemplary form of the present disclosure, and illustrates a hydraulic control system of a friction member related to a gear stage (e.g., first forward gear stage) where starting control is performed.

Here, for ease of description, a first forward gear stage is exemplified as a gear stage where starting control is performed. The gear stage where the starting control is performed is not limited to the first forward gear stage, but may be a second forward gear stage, a reverse gear stage, etc.

Referring to FIG. 1, an automatic transmission of a vehicle provided with an ISG system includes two friction members (clutch CL and brake BK) that are operated at the first forward gear stage where the starting control is performed. The exemplary form of the present disclosure is configured to supply reserve operating hydraulic pressure to the clutch CL of two friction members operated at the first forward gear stage. It is exemplified but is not limited that two friction members are operated at the first forward gear stage.

The two friction members receive hydraulic pressure by operation of a mechanical hydraulic pump MOP driven by power of the engine when the engine ENG operates, and receive hydraulic pressure by operation of an electric hydraulic pump EOP when the engine is stopped.

In further detail, if the mechanical hydraulic pump MOP is driven by the power of the engine ENG, the mechanical hydraulic pump MOP generates hydraulic pressure for torque converter, hydraulic pressure for shift control, and hydraulic pressure for lubrication.

The hydraulic pressure generated by the mechanical hydraulic pump MOP is regulated to be a stable line pressure by a regulator valve REGV. A portion of the line pressure regulated by the regulator valve REGV is supplied through a hydraulic line (not shown) as hydraulic pressure for starting and hydraulic pressure for lubrication, and the other portion of the line pressure is supplied to a manual valve MV through a first hydraulic line 11.

The hydraulic pressure supplied to the manual valve MV is supplied to a linear solenoid valve VFS through a second hydraulic line 12 at drive D range.

The hydraulic pressure controlled by the linear solenoid valve VFS is supplied to a first switch valve SWV1 through a third hydraulic line 13, and the hydraulic pressure supplied to the first switch valve SWV1 is selectively supplied to a friction member (clutch CL) operated when starting through the fourth hydraulic line 14.

In addition, a first check valve CV1 and an orifice OR are disposed in a parallel with each other on the second hydraulic line 12 upstream of the linear solenoid valve VFS.

Fluid stored in an oil pan OP can be supplied to the friction member CL through a hydraulic line other than the above-mentioned hydraulic lines. In detail, the electric hydraulic pump EOP pumps the fluid stored in the oil pan OP through a fifth hydraulic line 15 connected to an input line upstream of the mechanical hydraulic pump MOP and generates hydraulic pressure. The generated hydraulic pressure is supplied to a second switch valve SWV2 through a sixth hydraulic line 16. In addition, the hydraulic pressure supplied to the second switch valve SWV2 is selectively supplied to the fourth hydraulic line 14 through a seventh hydraulic line 17 or to an inlet side of the linear solenoid valve VFS through an eighth hydraulic line 18.

In addition, a second check valve CV2 is disposed on the eighth hydraulic line 18. The second check valve CV2 inhibits or prevents the fluid from flowing from the linear solenoid valve VFS to the electric hydraulic pump EOP.

Generally, the mechanical hydraulic pump MOP is a gear pump, pumps the fluid stored in the oil pan OP through a strainer STR by the power of the engine, pressure-feeds the fluid to the regulator valve REGV. The regulator valve REGV recirculates a portion of the hydraulic pressure supplied from the first hydraulic line 11 through a recirculation hydraulic line 19 to control the hydraulic pressure to be stable, and supplies the stable hydraulic pressure to the manual valve MV.

The manual valve MV supplies the hydraulic pressure from the first hydraulic line 11 selectively through a D range output port and an R range output port according to manipulation of a shift lever, and the linear solenoid valve VFS is controlled by a transmission control unit (not shown) to control the hydraulic pressure from the second hydraulic line 12 and to supply the controlled hydraulic pressure to the first switch valve SWV1 through the third hydraulic line 13.

The first switch valve SWV1 is controlled by the hydraulic pressure supplied through the second hydraulic line 12 such that the hydraulic pressure of the linear solenoid valve VFS supplied through the third hydraulic line 13 is selectively supplied to the friction member CL through the fourth hydraulic line 14.

Therefore, the first switch valve SWV1 connects the third hydraulic line 13 with the fourth hydraulic line 14 if the hydraulic pressure of the second hydraulic line 12 is supplied to the first switch valve SWV1 as control pressure by operation of the engine, and disconnects the third hydraulic line 13 from the fourth hydraulic line 14 if the hydraulic pressure of the second hydraulic line 12 is not supplied.

In addition, since the first check valve CV1 and the orifice OR are disposed in parallel with each other on the second hydraulic line 12 upstream of the linear solenoid valve VFS. The first check valve CV1 and the orifice OR cooperates to stably supply the hydraulic pressure to the linear solenoid valve VFS and to postpone exhaust of the hydraulic pressure from the linear solenoid valve VFS.

The electric hydraulic pump EOP, for example, may include an electromagnetic portion for generating electromagnetic force by current applied to a coil, a cylinder provided with an input port and an output port, a piston being slidable in the cylinder by electromagnetic force of the electromagnetic portion, a spring elastically supporting the piston against the electromagnetic force, an input check valve mounted in the cylinder and inhibiting or preventing backflow of the fluid flowing into the input port, and an output check valve mounted in the piston and inhibiting or preventing backflow of the fluid discharged from the output port. The electric hydraulic pump EOP may be a solenoid pump which can pressure-feed the hydraulic pressure by reciprocating the piston by an electric signal applied to the coil.

The second switch valve SWV2 is controlled by the hydraulic pressure supplied through the second hydraulic line 12 to supply the hydraulic pressure supplied from the electric hydraulic pump EOP through the sixth hydraulic line 16 selectively to the fourth hydraulic line 14 through the seventh hydraulic line 17 or to the eighth hydraulic line 18.

Therefore, the second switch valve SWV2 connects the sixth hydraulic line 16 with the eighth hydraulic line 18 if the hydraulic pressure of the second hydraulic line 12 is supplied to the second switch valve SWV2 as control pressure by operation of the engine, and connects the sixth hydraulic line 16 with the seventh hydraulic line 17 if the hydraulic pressure of the second hydraulic line 12 is not supplied by stopping of the engine.

FIG. 2 illustrates a flow of hydraulic pressure to a friction member related to a gear stage (e.g., first forward gear stage) where starting control is performed when an engine begins to start in a hydraulic control system of an automatic transmission for a vehicle provided with an ISG system in an exemplary form of the present disclosure.

Referring to FIG. 2, if the engine ENG is started in a state that the manual valve MV is switched to a D range, the mechanical hydraulic pump MOP is driven to pump the fluid in the oil pan OP and pressure-feed the fluid to the regulator valve REGV through the first hydraulic line 11.

The regulator valve REGV controls the hydraulic pressure pressure-fed from the mechanical hydraulic pump MOP to be stable line pressure and supplies the stable line pressure to the manual valve MV, and the hydraulic pressure supplied to the manual valve MV is discharged to the second hydraulic line 12 through the output port for the D range.

The hydraulic pressure supplied to the second hydraulic line 12 is supplied to the first and the second switch valves SWV1 and SWV2 as the control pressures thereof, and is controlled to be operation hydraulic pressure of the friction member CL by the linear solenoid valve VFS. The operation hydraulic pressure is supplied to the friction member CL through the first switch valve SWV1. Therefore, the vehicle starts.

In addition, the hydraulic pressure flowing from the fourth hydraulic line 14 to the electric hydraulic pump EOP through the seventh hydraulic line 27 is blocked by the second switch valve SWV2.

In FIG. 2, a dotted line arrow represents the hydraulic pressure flowing from the electric hydraulic pump EOP through the sixth hydraulic line 16, the second switch valve SWV2, and the eighth hydraulic line 18. The hydraulic pressure is supplied to the electric hydraulic pump EOP at a time when the hydraulic pressure is not supplied from the mechanical hydraulic pump MOP to the linear solenoid valve VFS in static shift from the drive (D) range to a neutral (N) range. Therefore, controllability of the friction member CL may be improved in the static shift.

FIG. 3 illustrates flow of hydraulic pressure to a friction member related to a gear stage (e.g., first forward gear stage) where starting control is performed when an engine is stopped in a hydraulic control system of an automatic transmission for a vehicle provided with an ISG system in one exemplary form of the present disclosure.

Referring to FIG. 3, in a case that the vehicle temporarily stops due to traffic condition, an automatic stop conditions that vehicle speed is "0", an accelerator pedal is off-state, a brake pedal is on-state, the engine ENG is idling for a predetermined time are satisfied in a state that the manual valve MV is positioned at the D range. In this case, the engine ENG is automatically stopped.

If the engine ENG is stopped, the hydraulic pressure is not generated by the mechanical hydraulic pump MOP. Instead, the transmission control unit operates the electric hydraulic pump EOP to pump the fluid in the oil pan OP through the fifth hydraulic line 15 and to supply the hydraulic pressure to the friction member CL through the sixth hydraulic line 16, the second switch valve SWV2, and the seventh hydraulic line 17. Therefore, the reserve operating hydraulic pressure for restarting the vehicle is maintained in a hydraulic chamber of the friction member CL.

If a predetermined auto starting condition is satisfied in a state that the engine ENG is stopped, the automatically stopped engine ENG is automatically started again. At this time, the hydraulic pressure pressure-fed from the mechanical hydraulic pump MOP is supplied to the friction member CL through hydraulic lines illustrated in FIG. 2, and the supply of the hydraulic pressure by the electric hydraulic pump EOP is stopped.

The hydraulic control system of an automatic transmission for a vehicle provided with an ISG system supplies the reserve operating hydraulic pressure to the friction member CL operated at the gear stage where the starting control is performed even though the engine ENG is stopped. Therefore, the vehicle may be restarted smoothly.

Since the solenoid pump is used as the electric hydraulic pump, weight and cost may be reduced.

In addition, mountability may be improved by enabling the solenoid pump to be mounted in a valve body.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A hydraulic control system of an automatic transmission for a vehicle provided with an idle stop and go (ISG) system, the hydraulic control system configured to supply hydraulic pressure to at least one friction member of friction members operated at a gear stage where starting control is performed, the hydraulic control system comprising:
    a mechanical hydraulic pump driven by torque of an engine and configured to pump a fluid stored in an oil pan;
    a regulator valve configured to regulate hydraulic pressure fed from the mechanical hydraulic pump to be stable;
    a manual valve configured to receive the hydraulic pressure from the regulator valve through a first hydraulic line and to supply the hydraulic pressure to a second hydraulic line by manipulation of a shift lever;
    a linear solenoid valve configured to control the hydraulic pressure supplied from the manual valve through the second hydraulic line and to supply the controlled hydraulic pressure to a third hydraulic line;
    a first switch valve configured to selectively supply the hydraulic pressure supplied from the linear solenoid valve through the third hydraulic line to the at least one friction member through a fourth hydraulic line; and
    an electric hydraulic pump driven by electric energy and configured to pump the fluid stored in the oil pan through a fifth hydraulic line and to feed the pumped fluid to a second switch valve through a sixth hydraulic line,
    wherein the second switch valve is configured to supply the hydraulic pressure of the electric hydraulic pump supplied through the sixth hydraulic line to a seventh hydraulic line connected to the fourth hydraulic line, or to the second hydraulic line at an upstream side of the linear solenoid valve through an eighth hydraulic line.

2. The hydraulic control system of claim 1, wherein a check valve and an orifice are disposed in parallel with each other on the second hydraulic line at the upstream side of the linear solenoid valve.

3. The hydraulic control system of claim 1, wherein the first switch valve is configured to connect the third hydraulic line and the fourth hydraulic line when the hydraulic pressure of the second hydraulic line is supplied to the first switch valve as control pressure.

4. The hydraulic control system of claim 1, wherein the second switch valve is configured to connect the sixth hydraulic line and the eighth hydraulic line when the hydraulic pressure of the second hydraulic line is supplied to the second switch as control pressure, and to connect the sixth hydraulic line and the seventh hydraulic line when the control pressure of the second hydraulic line is not supplied to the second switch valve.

5. The hydraulic control system of claim 4, wherein the second switch valve is configured to supply the hydraulic pressure of the electric hydraulic pump to the linear solenoid valve through the sixth hydraulic line and the eighth hydraulic line in a static shift from a drive (D) range to a neutral (N) range.

6. The hydraulic control system of claim 1, wherein the electric hydraulic pump is a solenoid pump.

7. The hydraulic control system of claim 1, wherein a second check valve configured to inhibit the hydraulic pressure from flowing back to the second switch valve is disposed on the eighth hydraulic line.

8. A hydraulic control system of an automatic transmission for a vehicle provided with an idle stop and go (ISG) system, the hydraulic control system configured to supply hydraulic pressure to at least one friction member of friction members operated at a gear stage where starting control is performed, the hydraulic control system comprising:
    a mechanical hydraulic pump driven by an engine;
    a linear solenoid valve configured to control hydraulic pressure generated by the mechanical hydraulic pump or supplied hydraulic pressure;
    a first switch valve configured selectively to supply or not to supply the controlled hydraulic pressure to the at least one friction member;
    an electric hydraulic pump driven by electric energy; and
    a second switch valve configured to selectively supply the hydraulic pressure, generated by the electric hydraulic pump, to the at least one friction member or to the linear solenoid valve, wherein the first switch valve and the second switch valve are controlled by a same hydraulic pressure.

9. The hydraulic control system of claim 8, wherein the same hydraulic pressure is the hydraulic pressure generated by the mechanical hydraulic pump or the controlled hydraulic pressure.

10. The hydraulic control system of claim 9, wherein the first switch valve is configured to supply the hydraulic pressure supplied from the linear solenoid valve to the at least one friction member, and the second switch valve is configured to supply the hydraulic pressure generated by the electric hydraulic pump to the linear solenoid valve when the mechanical hydraulic pump generates the hydraulic pressure.

11. The hydraulic control system of claim 9, wherein the second switch valve is configured to supply the hydraulic pressure generated by the electric hydraulic pump to the at least one friction member when the mechanical hydraulic pump does not generate the hydraulic pressure.

\* \* \* \* \*